(12) United States Patent
Chan et al.

(10) Patent No.: US 8,898,469 B2
(45) Date of Patent: Nov. 25, 2014

(54) SOFTWARE FEATURE AUTHORIZATION THROUGH DELEGATED AGENTS

(75) Inventors: Tat Keung Chan, San Diego, CA (US); Paul D. Baker, San Diego, CA (US); Christopher P. Gardner, San Diego, CA (US); Mark E. Gregotski, Jamison, PA (US); Ted R. Michaud, Medford, NJ (US); Xin Qiu, San Diego, CA (US); Jinsong Zheng, San Diego, CA (US)

(73) Assignee: Motorola Mobility LLC, Chicago, IL (US)

( * ) Notice: Subject to any disclaimer, the term of this patent is extended or adjusted under 35 U.S.C. 154(b) by 401 days.

(21) Appl. No.: 13/021,384

(22) Filed: Feb. 4, 2011

(65) Prior Publication Data
US 2011/0197077 A1 Aug. 11, 2011

Related U.S. Application Data

(60) Provisional application No. 61/302,068, filed on Feb. 5, 2010.

(51) Int. Cl.
*H04L 9/32* (2006.01)
*G06F 21/10* (2013.01)
(52) U.S. Cl.
CPC ............. *G06F 21/10* (2013.01); *Y10S 705/902* (2013.01); *Y10S 705/911* (2013.01)
USPC ........... 713/169; 705/902; 705/911; 713/167; 709/223; 709/225
(58) Field of Classification Search
CPC ................... H04L 2463/101; H04L 63/0869; H04L 9/3202; H04L 9/08; H04L 9/32; G06F 21/105; G06F 21/10; G06F 21/121
USPC .......................................................... 713/169
See application file for complete search history.

(56) References Cited

U.S. PATENT DOCUMENTS 6,189,146 B1 * 2/2001 Misra et al. .................... 717/177
6,526,456 B1 * 2/2003 Allan et al. .................... 719/328

(Continued)

OTHER PUBLICATIONS

NPL provided by applicant—Marked for clarity: Rosenblatt et al., Digital Rights Management—Business and Technology Passage, Dec. 31, 2002.*

(Continued)

*Primary Examiner* — Farid Homayounmehr
*Assistant Examiner* — Lizbeth Torres-Diaz
(74) *Attorney, Agent, or Firm* — Fox Rothschild LLP

(57) ABSTRACT

A method enables selected features of a software product residing on an end user electronic device with a license delivered from a licensing provider to a service provider of the end user electronic device. The method includes requesting at least one license to authorize a first service provider. An encrypted installation key uniquely associated with the first service provider is received as well as an authorization agent module for installation on one or more authorization agent devices associated with the first service provider. The encrypted installation key and the authorization agent module are installed on the authorization agent devices. A device-unique identifier (DUID) is generated for each authorization agent device based on hardware characteristics of the respective authorization agent devices. The DUID and the encrypted installation key are sent from the authorization agent device to a licensing provider to obtain the requested license. The requested license is received by the authorization agent devices if the DUID and the encrypted installation key are validated by the licensing provider. The license on authorization agent device authorizes and enables the selected features of the software product on an end user electronic device.

20 Claims, 10 Drawing Sheets

(56) References Cited

U.S. PATENT DOCUMENTS

| | | | |
|---|---|---|---|
| 7,330,978 B1* | 2/2008 | Harrington et al. | 713/191 |
| 7,707,406 B2* | 4/2010 | Qiu | 713/157 |
| 7,877,600 B2* | 1/2011 | Qiu et al. | 713/157 |
| 2002/0007412 A1* | 1/2002 | Paridaens et al. | 709/229 |
| 2003/0149669 A1* | 8/2003 | Howells et al. | 705/51 |
| 2003/0156719 A1* | 8/2003 | Cronce | 380/256 |
| 2003/0185395 A1* | 10/2003 | Lee et al. | 380/277 |
| 2006/0036554 A1* | 2/2006 | Schrock et al. | 705/75 |
| 2006/0190409 A1* | 8/2006 | Hillegass et al. | 705/59 |
| 2006/0242083 A1* | 10/2006 | Chavez | 705/59 |
| 2007/0204078 A1* | 8/2007 | Boccon-Gibod et al. | 710/54 |
| 2008/0153588 A1* | 6/2008 | Muir et al. | 463/29 |
| 2008/0209575 A1* | 8/2008 | Conrado et al. | 726/29 |
| 2012/0066592 A1* | 3/2012 | Issa et al. | 715/716 |
| 2012/0317659 A1* | 12/2012 | Stefik et al. | 726/29 |

OTHER PUBLICATIONS

Rosenblatt et al., "Digital Rights Management—Business and Technology Passage" Digital Rights Management—Business and Technology, Dec. 31, 2002, 31 pages.*

Patent Cooperation Treaty, "PCT Search Report and Written Opinion of the International Searching Authority" for International Application No. PCT/US2011/023862 Jun. 28, 2011, 9 pages.

Rosenblatt et al., "Digital Rights Management - Business and Technology Passage" Digital Rights Management—Business and Technology, XX, XX, Dec. 31, 2002, 31 pages. XP-002439676.

* cited by examiner

SOFTWARE FEATURE AUTHORIZATION THROUGH DELEGATED AGENTS

STATEMENT OF RELATED APPLICATIONS

This application claims the benefit of U.S. Provisional Patent Application Ser. No. 61/302,068, filed Feb. 5, 2010, which is incorporated herein by reference in its entirety.

BACKGROUND

Today it is common for homes and offices to contain many electronic devices that provide, receive and/or support services, such as voice communication, video communication, data services, and security from a service provider. Examples of these devices include wireless and wired telephones, alarm systems, computers, digital cameras, televisions, broadband home routers, and set top boxes. For instance, set top boxes provide content delivery services such as IPTV services through content delivery networks such as IPTV networks. When a user experiences difficulty in receiving the services, the user may call a customer service representative to seek assistance. The customer service representative can often respond to routine issues, but may have difficulty responding to more complex issues. This often results in the service provider sending a technician to the user's location to diagnose and resolve the issue.

Because of their complexity many electronic devices are often accompanied by specialized diagnostic software to identify and correct problems that may arise. Such software may be resident on an electronic device when it is delivered to the customer or it may be installed by the technician upon his or her arrival. For a variety of reasons the software provider may wish to provide limited access to the diagnostic software to the various parties. For instance, because of its complexity the software provider may wish to prevent the end user from accessing the software in order to prevent its improper use by the end user, which could further complicate the diagnostic and repair process. In addition, the software provider may wish to control the technician's access to the diagnostic software in order to require the technician to provide an accounting of each use so that, for instance, it can charge a fee on a per use basis.

Typically, limited access to the software can be resolved through a software licensing scheme, where the software requires a legitimate software license to enable the requested features. However, this solution becomes problematic if the software, or certain features of the software, should only be enabled under certain controlled scenarios (such as when a technician is present during a service visit). In addition, for any of a variety of reasons such as a malfunction in the equipment, the device may not be able to communicate with a license server over an external network (such as the Internet) when it needs to obtain authorization to activate the software features. Therefore, it would be advantageous if a local authority could be used to authorize the desired software features upon arrival of the technician.

SUMMARY

In accordance with one aspect of the invention, a method is provided for enabling selected features of a software product residing on an end user electronic device with a license delivered from a licensing provider to a service provider of the end user electronic device. The method includes requesting at least one license to authorize a first service provider to enable selected features of a software product residing on an end user electronic device. An encrypted installation key uniquely associated with the first service provider is received as well as an authorization agent module for installation on one or more authorization agent devices associated with the first service provider. The encrypted installation key and the authorization agent module are installed on the one or more authorization agent devices. A device-unique identifier (DUID) is generated for each authorization agent device based on hardware characteristics of the respective authorization agent devices. The DUID and the encrypted installation key are sent from at least one of the authorization agent devices to a licensing provider in order to obtain the requested license. The requested license is received on at least one of the authorization agent devices if the DUID and the encrypted installation key are validated by the licensing provider. The license on authorization agent device is used to authorize and enable the selected features of the software product on an end user electronic device.

In accordance with another aspect of the invention, a method is provided for delegating authorization of selected features of a software product residing on end user electronic devices from a licensing provider to service providers of the end user electronic devices. The method includes receiving a request from a first service provider for authorization to use one or more authorization agent devices to enable selected features of a software product residing on an end user electronic device. An installation key is generated which is to be uniquely associated with the first service provider. The installation key is encrypted and an authorization agent module and the encrypted installation key are sent for installation on one or more authorization agent devices associated with the first service provider. A request is received for a license to enable the selected features of the software product. The request includes the encrypted installation key and a device-unique identifier (DUID) from at least a first of the authorization agent devices. The DUID is based on hardware characteristics of the first authorization agent device. The first service provider is authenticated by validating the encrypted installation key received from the first authorization agent device. The requested license is sent to the first authorization agent device if the encrypted installation key is validated by the licensing provider;

DETAILED DESCRIPTION

For purposes of illustration the conditional authorization of software features will be described in terms of a diagnostic software product that is used on a set top box located on the end-user premises. More generally, however, the system and techniques described herein may be used to enable features associated with any type of software product resident on any end user electronic device.

As detailed below, this disclosure describes a system whereby the authorization is delegated from a central licensing server to an entity (such as a laptop computer), which would then serve as the local authority to enable certain software features on the end-user electronic device located at the end-user premises.

Environment Overview

Figure 1:
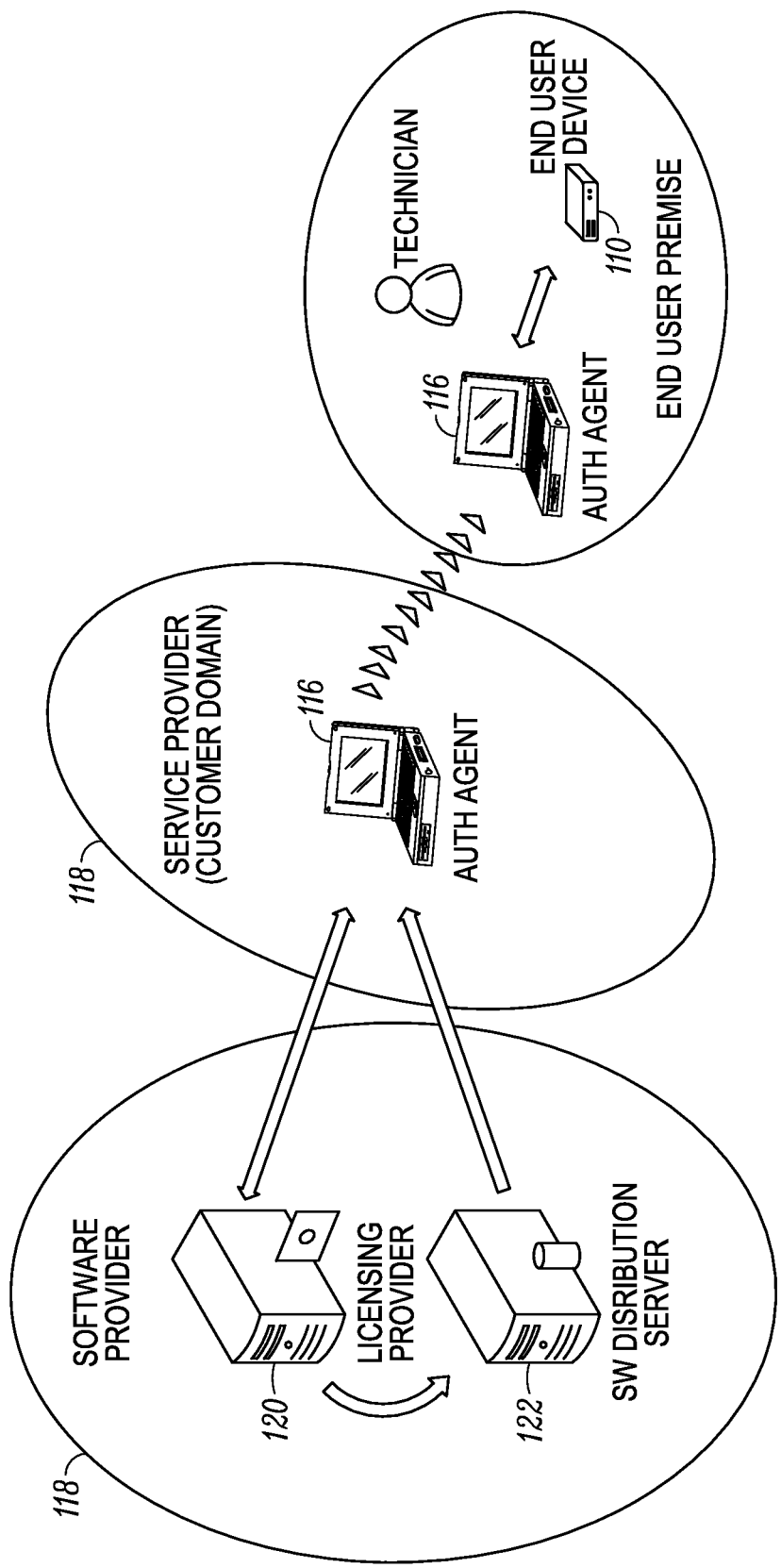
FIG. 1 depicts an illustrative environment in which diagnostic assistance or other services are provided to an end user electronic device which is located on the end user premises.

FIG. 1 depicts an illustrative environment in which diagnostic assistance or other services are provided to an end user electronic device 110 which is located on the end user premises 112. End user electronic device may be a relatively sophisticated device, performing a variety of services and functions. For example, the device may be a set top box (STB), which is a media device that receives programming content from a head end system operated by a content provider.

In this example the end user electronic device 110 is maintained by a server provider 114. For instance, in the case of a set top box, the service provider 114 may be a network operator who operates a cable network or other content delivery system. When the end user device 110 needs service, either for a repair, upgrade or the like, the service provider 114 may dispatch a technician to the end user's premises. Diagnostic or other software products needed to perform the service may already be installed on the end user electronic device 110. Alternatively, the technician may need to install the software product upon arrival. In either case the technician is equipped with an authorization agent device 116, which may be a general-purpose computing device such as a notebook computer or even a more specialized computing device such as a smart phone, provided it has sufficient computing capabilities to perform the tasks of the authorization agent device 116.

Prior to arriving at the end user premises 112, the authorization agent device 116 has been provided with a valid license that can be used to enable certain software features of the diagnostic software product. The license is obtained from a software provider 118 who has provided the diagnostic or other software products to the service provider 114. In this sense service provider 114 is a customer of the software provider 118. Once on the end user premises 112, the technician establishes communication between the authorization agent device 116 and the end user electronic device 110 over a wired or wireless connection and requests authorization to enable the software features needed to perform the diagnostic or other requested service. If necessary, of course, the technician first loads the software product onto the end user electronic device.

In yet another implementation, the software product may comprise two components: a first component that contains the software needed to obtain authorization from the authorization agent device and a second component that contains the software needed to implement the features. The first component may be static and pre-provisioned to the end user electronic device. The second component of the software product may be loaded after the authorization is provided by the authorization agent device.

In the scenario illustrated in FIG. 1, the software provider 118 delivers the license for the software product to the service provider 114 using a license server 120. Likewise, if necessary, the software provider 118 may also deliver the software product to the service provider 114 using a software distribution server 122. The service provider 114 may in turn install the license (and the software product) on multiple authorization agent devices 116, each of which can be taken by a technician into the field to perform the necessary service on end user electronic devices.

Figure 2:
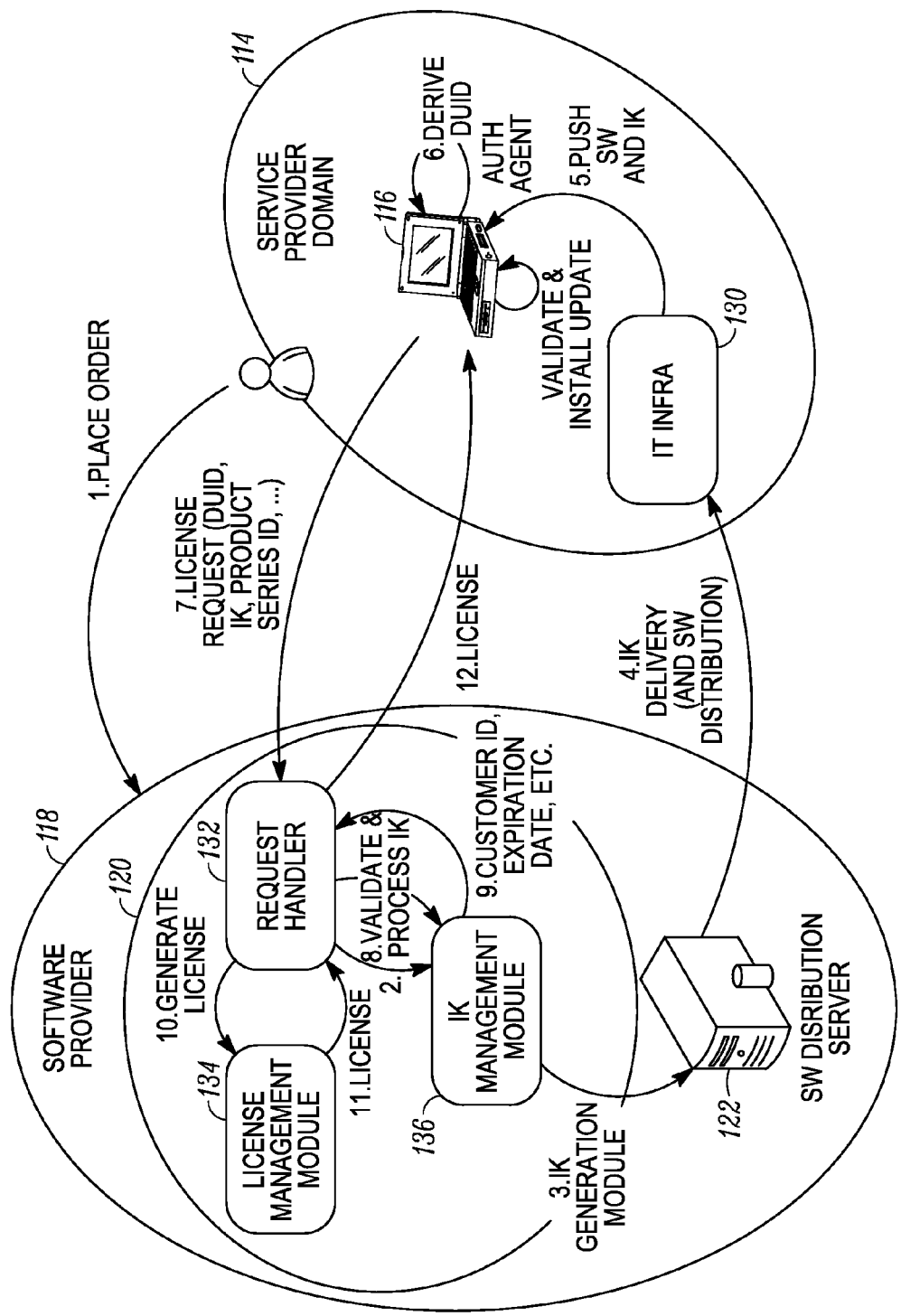
FIG. 2 shows one example of the logical components employed by the software provider and the service provider of FIG. 1 in more detail.

FIG. 2 shows one example of the logical components employed by the software provider 118 and the service provider 114 in more detail. Turning first to the software provider 118, the licensing server 120 may be logically divided into the following components: a license management module 134, a request handler 132 and an installation key (IK) management module 136. The request handler 132 communicates with the service provider 114 to receive and fulfill license requests. The license management module 134 generates and validates the licenses and delivers them to the request handler 132 for delivery to the service provider 114. The IK management module 136 generates and validates the installation keys based on customer information received from the request handler 132. In addition to delivering the software product to the service provider 114 when necessary, the software distribution server 122 associated with the software provider 118 may also deliver the installation keys to the service provider 114.

The logical components of the service provider 114 shown in FIG. 2 includes the authorization agent device 116 and IT infrastructure 130. While only a single authorization agent device 116 is depicted in FIG. 2, more generally, the service provider 114 may have any number of authorization agent devices so that multiple technicians can service multiple end users at the same time. The IT infrastructure 130 may communicate with the software provider 118 to receive the installation key and when, necessary, the software product itself. The installation key, which is unique for each service provider 114, is distributed to the authorization agent device(s) by the IT infrastructure 130.

Figure 3:
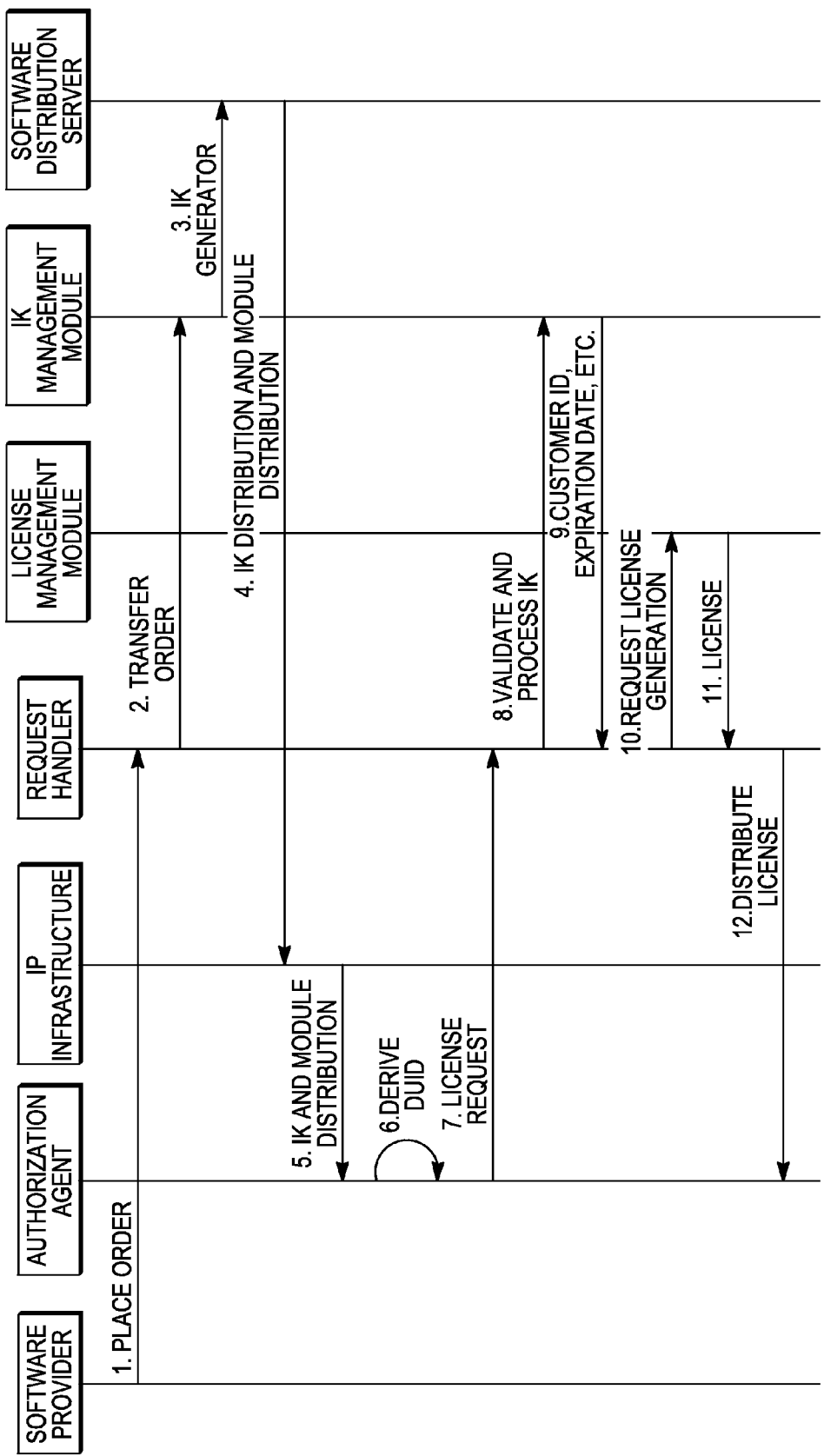
FIG. 3 shows one example of a data flow diagram illustrating the various messages, files and other data that may be communicated between the software provider and the service provider of FIG. 2 when the service provider is acquiring licenses for its authorization agent devices.

FIG. 3 is one example of a data flow diagram illustrating the various messages, files and other data that may be communicated between the software provider 118 and the service provider 114 of FIG. 2 when the service provider 114 is acquiring licenses for its authorization agent devices 116. For convenience this message flow is also overlaid on the logical diagram of FIG. 2.

In the example of FIG. 3 the process begins at 1 when the service provider 114 places an order with the software provider 118 for the software product and a specified (or unlimited) number of licenses to be distributed to its authorization agent devices 116. The order information is entered into the request handler 132 of the licensing server 120. The request handler 132 transfers the order information to the IK management module 136 at 2. In response, at 3, the IK management module 136 generates an installation key that is uniquely associated with the service provider 114 and transfers it to the software distribution server 122. The installation key can be used both as a product key to install the module and as an identifier of the service provider. The installation key may include information such as the identity of the software product or product series, the service provider's identity, the license expiration date, and other information. Part of the information included in the installation key may be obtained from the sales order placed by the service provider. Other information included in the installation key may be entered manually by a user (such as a salesperson or a program manager). The installation key may be encrypted and integrity protected to avoid tampering. Only the licensing server 120 holds the cryptographic key(s) needed to generate and decrypt the encrypted installation key.

The software distribution server 122 delivers the encrypted installation key and an authorization agent module to the service provider at 4. The authorization agent module is the software component that enables the authorization agent device 116 to use the license to activate or otherwise use the licensed features of the diagnostic software product resident on the end user electronic device. The service provider 114, in turn, uses the IT infrastructure 130, which may include any suitable internal means of distribution, to deliver at 5 the authorization agent module and the installation key to its various authorization agent devices 116.

During the installation of the authorization agent module on an authorization agent device 116 at 6, a device-unique identifier (DUID) is derived from the hardware specific to each authorization agent device 116. The DUID is used for identification purposes. In particular, the DUID will be used to bind the license to the specific authorization agent device. The DUID may be derived using any suitable algorithm. During the installation of the authorization agent module, the authorization agent device 116 sends a license request at 7 to the request handler 132 in the software provider's licensing server 120. The request may include information such as the DUID and the encrypted installation key.

Upon receiving the request, the request handler 132 transfers the installation key to the IK management module 136 to check the validity of the installation key at 8. The IK management module 136 also decrypts the key to retrieve the embedded information such as the software product series identity, the service provider's identity, and the license expiration date. Based on this information, which is passed to the request handler 132 at 9, the request handler 132 authenticates the service provider and determines if the service provider has sufficient "credit" for generating a new license. If so, the request handler 132 has the license management module 134 generate at 10 a new license for the authorization agent device 116, which is passed back to the request handler 132 at 11. In some cases an automatic or manual review process may be performed before generating the license to ensure that the details (e.g., the requested features, specified product levels) in the license request are in good order. If not, the incorrect information can be corrected during this review process. The license includes information such as the DUID of the authorization agent device, the expiration date and the software product series ID. Other information may be included in license such as information specifying the particular software features that are to be enabled, for example.

The license may be digitally signed by the licensing server. In some implementations the license may be in the form of a digital certificate (e.g., an X.509 certificate) and an associated private key. In this case the authorization agent device may use the private key to sign authorization response (as described below).

In some implementations, in addition to checking the validity of the installation key, the IK management module 134 performs a second step to authenticate the service provider. In this second step the IP address from which the request was received is compared to a list of authorized IP addresses that has previously been provided by the service provider 114. In other words, in this implementation the IK management module 136 uses two identifiers to authenticate the service provider: the installation key and the IP address. By using the IP address as an identifier, the licensing server 120 can ensure that the request is being received over a network that is approved by the service provider. In this way if the authorization agent device is misappropriated and an attempt is made to obtain a license over an unauthorized network, the request will be denied.

After the license is generated the request handler 132 delivers it to the authorization agent module in the authorization agent device at 12. The authorization agent module installs and validates the license. This process may include checking that the DUID in the license matches the DUID of the authorization agent device itself and validating the license using a trusted verification key, which may be embedded in the authorization agent module. If the license is in the form of a digital certificate and a private key, the authorization agent module may also verify that the private key and the public key in the certificate matches one another. In addition, the authorization agent module may also verify that the digital certificate is valid and chained to the appropriate certificate authority (CA). In some cases a certificate authority hierarchy may be used. For instance, a three level hierarchy may be used in order to provide sufficient flexibility so that, for example, if a subordinate CA (Sub-CA) is used to generate licenses for software products in a product line, the license for these software products in the same product line can be revoked by simply revoking the Sub-CA, without having to revoke individual licenses.

Once the installation process is completed the authorization agent device 116 is capable of authorizing end user electronic devices to use the diagnostic or other software products as described below in connection with FIG. 4.

Figure 4:
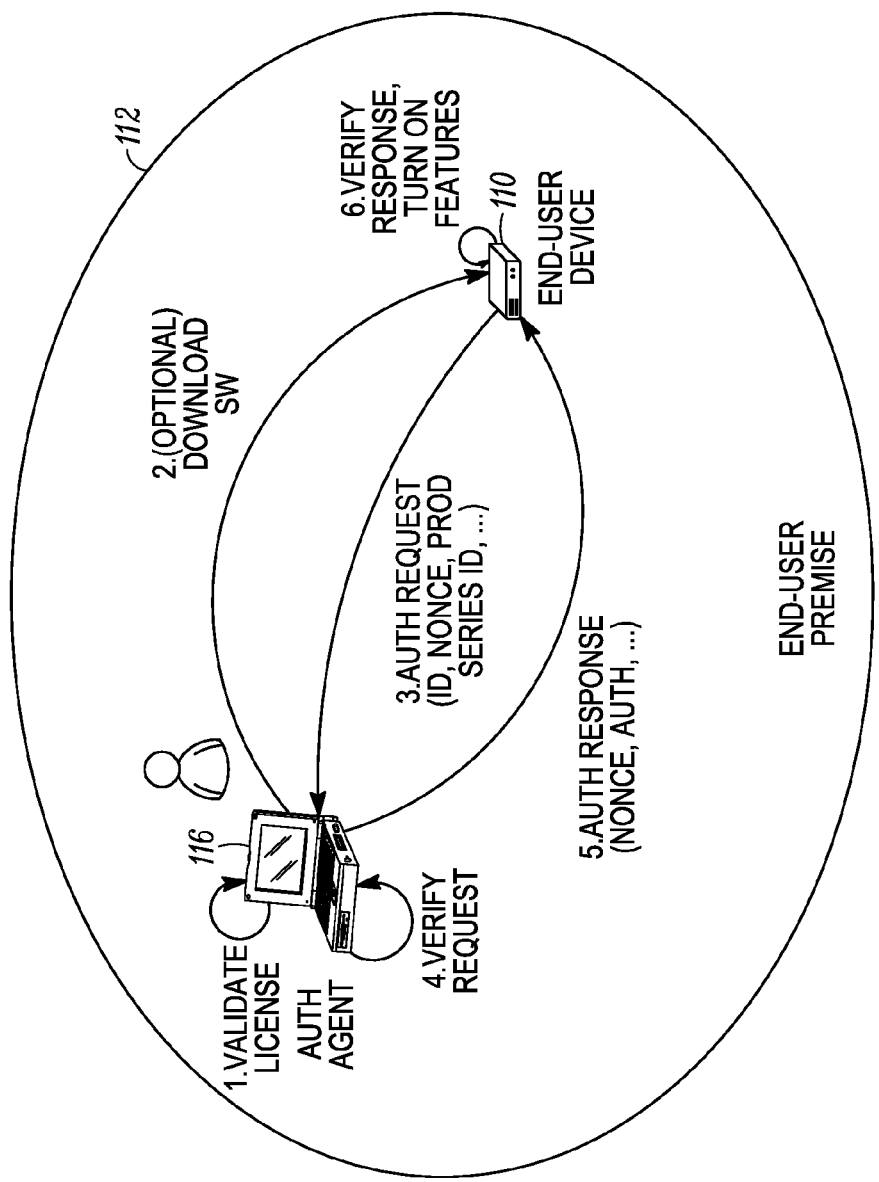
FIG. 4 shows one example of a process that may be performed by a technician on the end-user premises when authorizing selected features of the diagnostic software product resident on the end user electronic device.

FIG. 4 shows one example of a process that may be performed by a technician on the end-user premises 112 when authorizing selected features of the diagnostic software product resident on the end user electronic device 110. First, at 1, the technician establishes communication between the authorization agent device 116 and the end user electronic device 110. At this point the authorization agent module and license are assumed to have been previously installed on the authorization agent device. When the authorization agent module is initialized, it will check whether there is a valid license installed. If not, it will not be able to authorize the end-user device.

As previously mentioned, the diagnostic or other software product may or may not have already been loaded onto the end user electronic device. If necessary, the software product may be loaded onto the electronic device 110 through the authorization agent device 116 at 2. In any case, when the end-user electronic device 110 executes the software product, it sends a request at 3 to the authorization agent module on the authorization agent device 116. The request includes the end-user device identity, a nonce (which is a one-time-use random number generated by the end-user device to prevent replay attacks), the software product series ID, as well any other necessary information such as the specification of those features for which authorization is requested. The request may be signed by the end-user electronic device 110 to ensure its authenticity. At 4 the authorization agent module verifies the signature of the request and checks whether it has a valid license that allows the requested features to be enabled.

If the verification passes, the authorization agent module sends an authorization response to the end-user device 110 at 5. The response, which includes the nonce value that was included with the request, is signed by the authorization agent module. If the license is a digital certificate and an associated private key, the module will use the private key to sign the response. The response will also include the authorization agent module's digital certificate and may include the certificates of the Sub-CA and root CA.

Upon receiving the response at 6, the end-user electronic device 110 verifies the signature on the response to ensure its authenticity. It will also verify that the end-user device identity, the nonce, the software product series ID, and any other appropriate information, match the values used in the request. If the license is a digital certificate, the electronic device also validates the certificate by comparing it against a pre-installed trusted CA certificate. Finally, if all validations pass, the software product will enable the features authorized.

Figure 5:
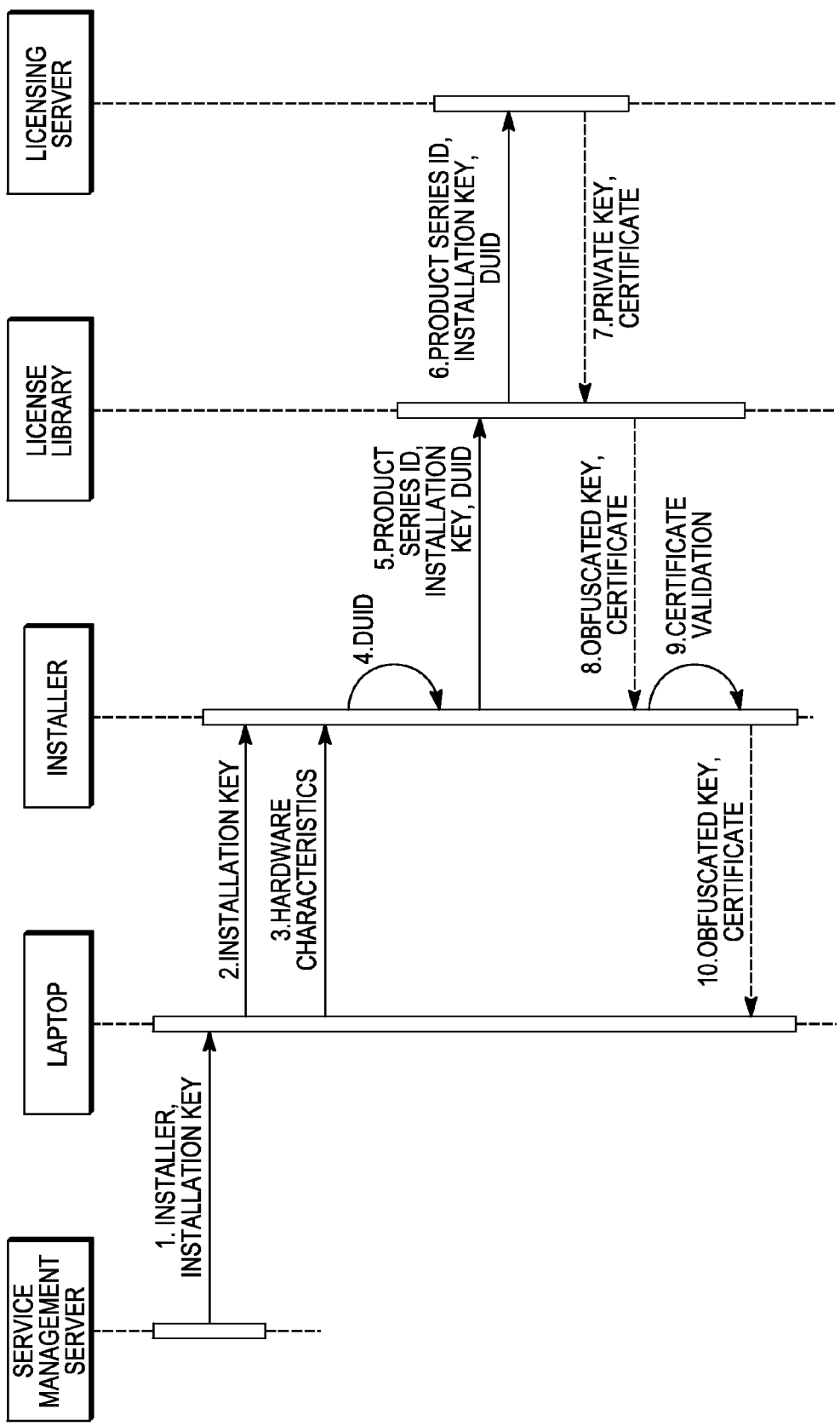
FIG. 5 shows a data flow diagram illustrating a more detailed example of the license acquisition process of FIG. 2.

A more detailed example of the license acquisition process of FIG. 2 is illustrated by the data flow diagram shown in FIG. 5. In this example, two additional components associated with the authorization agent module are illustrated: an installer component and a license library. Both of these components are located on the authorization agent device. The installer component is an installation program that is executed to install the authorization agent module on the authorization agent device. Also illustrated in FIG. 5 is a system management server, which is the server associated with the IT infrastructure 130 (see FIG. 2) that communicates with the authorization agent device in the service provider's domain.

The license acquisition process begins at 1 when the service provider, via the system management server, delivers the installation key to the authorization agent device, which in this example is a laptop computer. The laptop, in turn, internally delivers the installation and its pertinent hardware characteristics, to the installer component at 2 and 3, respectively. At 4, the installer component generates the DUID from the hardware characteristics. The installer component at 5 then sends the DUID, the product series ID (which is embedded in the installer component) and the installation key to the license library, which at 6 passes this information in a predefined format and protocol on to the software provider's licensing server over the Internet or other suitable network. After performing the necessary authentications, the licensing server at 7 generates and returns a license in the form of a certificate and private key to the licensing library in the laptop. In this example, the DUID of the authorization agent device is used as the common name field in the certificate in order to bind the certificate to the device. The licensing library internally transfers the certificate and an obfuscated (e.g., scrambled) rendition of the key to the installer component at 8, which at 9 verifies that the received certificate is issued to the laptop by comparing the common name of the certificate with the DUID of the laptop. The installer component stores the obfuscated key and certificate in the laptop at 11 so that they can be subsequently accessed by the authorization agent module.

Figure 6:
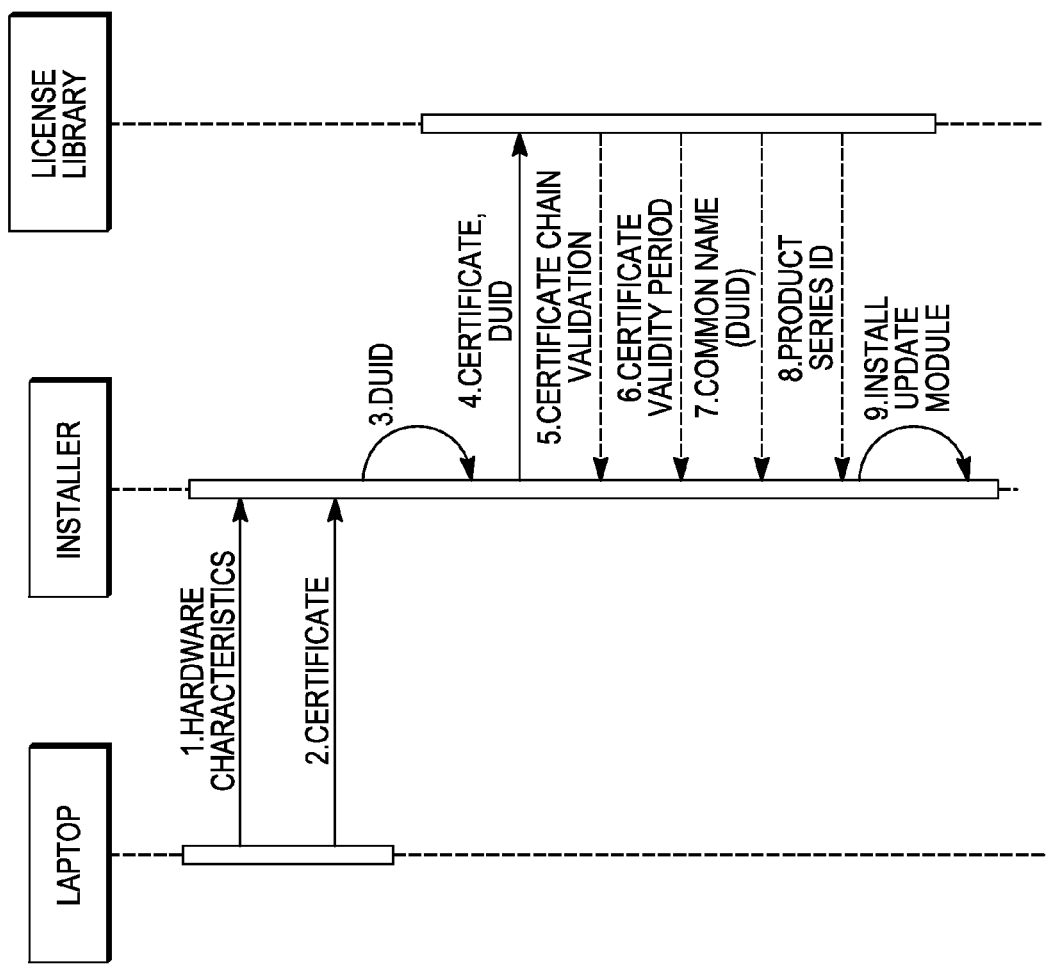
FIG. 6 is a message flow diagram showing one example of an authentication agent module upgrade process.

In some implementations the service provider may be entitled to one or more upgrades when a new version of the authorization agent module is released. FIG. 6 is a message flow diagram showing one example of the upgrade process. This process assumes that a previous release of the module is currently installed on the laptop and that a new version of the installer component has already been downloaded. In order to recreate the DUID, the process begins at 1 and 2 when the laptop internally transfers the pertinent hardware characteristics and the certificate, respectively, to the installer component. The installer component recreates the DUID at 3 and transfers the stored certificate and the DUID to the licensing library at 4. The installer component looks to the licensing library to have it confirm at 5, 6, 7 and 8, respectively, that the certificate is in the trusted certificate chain, that is has a current validity period, that is has the correct common name (to ensure that it is issued to the correct laptop) and that it has the correct product series ID. If all of these checks pass, the installer component installs the new authentication agent module at 9 without contacting the licensing server to obtain a new license.

Figure 7:
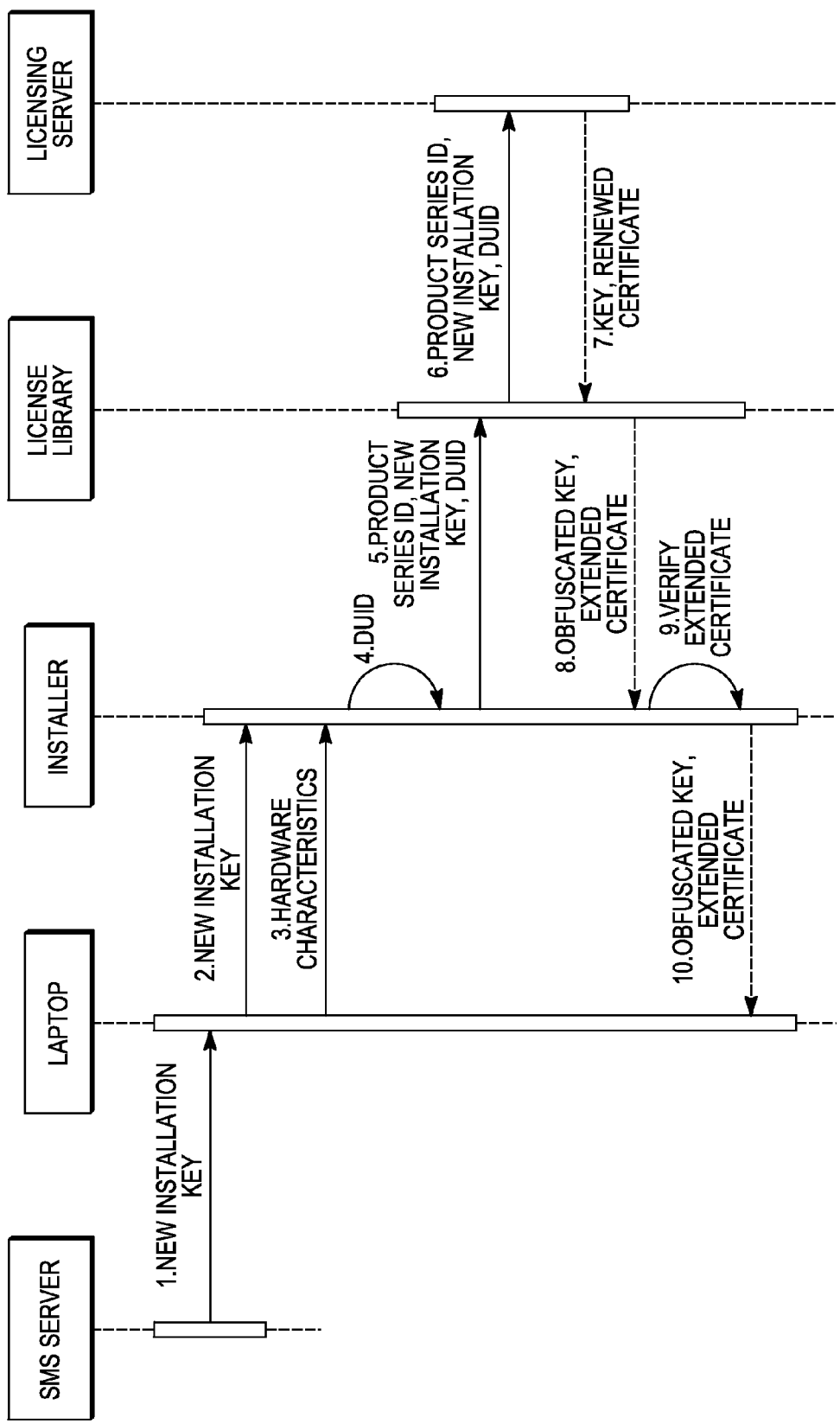
FIG. 7 is a message flow diagram illustrating one example of a process used to extend the validity period of a current license that is about to expire or which has expired.

In some cases the software provider may wish to extend a current license that is about to expire or which has expired. In this case the software provider provides the service provider with a new installation key. This process is depicted by the message flow diagram shown in FIG. 7. First, at 1, the service provider's service management server delivers the new installation key to the laptop, which in turn delivers it and its pertinent hardware characteristics to the installer component at 2 and 3, respectively. The installer component generates a DUID at 4 and transfers the product series ID, the new installation key and the DUID to the licensing library at 5 The licensing library communicates these same items in a predefined format and protocol to the licensing server at 6 to request a license The licensing server responds by sending a new license in the form of an renewed certificate with an extended expiration date as specified in the new installation key along with the current private key at 7. The license library transfers the private key and sends it and the renewed certificate to the installer component at 8, which generates an obfuscated key from the private key. At 9, the installer component verifies that the renewed certificate is properly issued to the laptop by comparing the common name on the certificate with the DUID of the laptop. If the verification is successful, the installer component stores the obfuscated key and the renewed certificate in the laptop at 10 so that they can be subsequently accessed by the authorization agent module.

Figure 8:
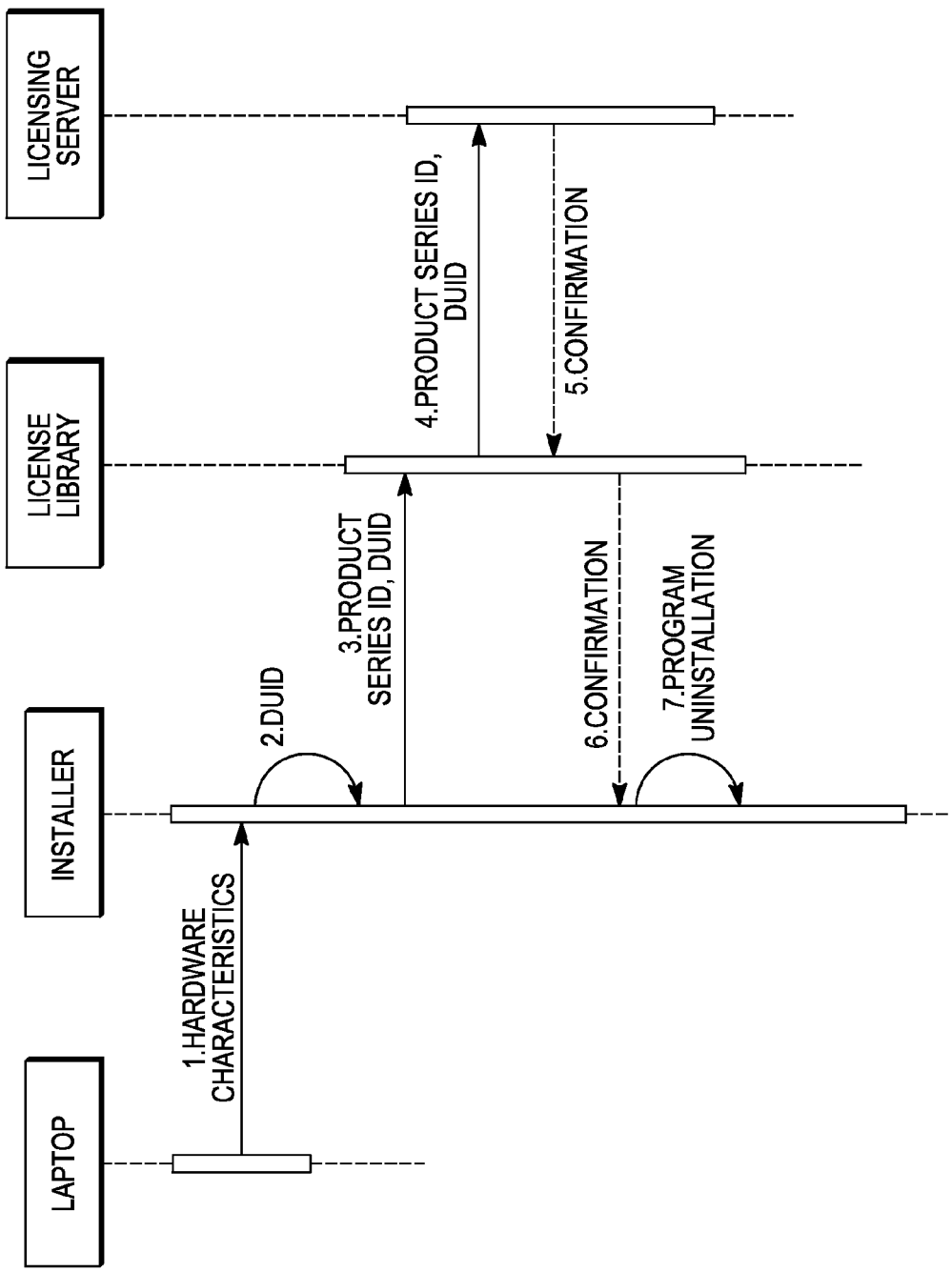
FIG. 8 is a message flow diagram showing one example of a process that may be used to un-install an authentication agent module from an authentication agent.

When the authentication agent module is to be removed from an authentication agent, the license should also be removed and the software provider notified so that the appropriate credit can be given to the service provider if required by business agreement. This process is illustrated by the message flow diagram of FIG. 8, which begins when the authentication agent (a laptop in this example) sends its hardware characteristics to the installer component at 1 from which the installer component recreates the DUID at 2. The DUID and the software product series ID embedded in the installer component are transferred by the installer component to the license library at 3, and the license library in turn communicates this information in a predefined format and protocol to the licensing server at 4 and notifies it of the un-installation. The license server sends a confirmation of the un-install to the licensing library at 5, which is communicated to the installer component at 6. Finally, at 7 the installer component uninstalls the authorization agent module and deletes the current license (i.e., the certificate and key).

Figure 9A:
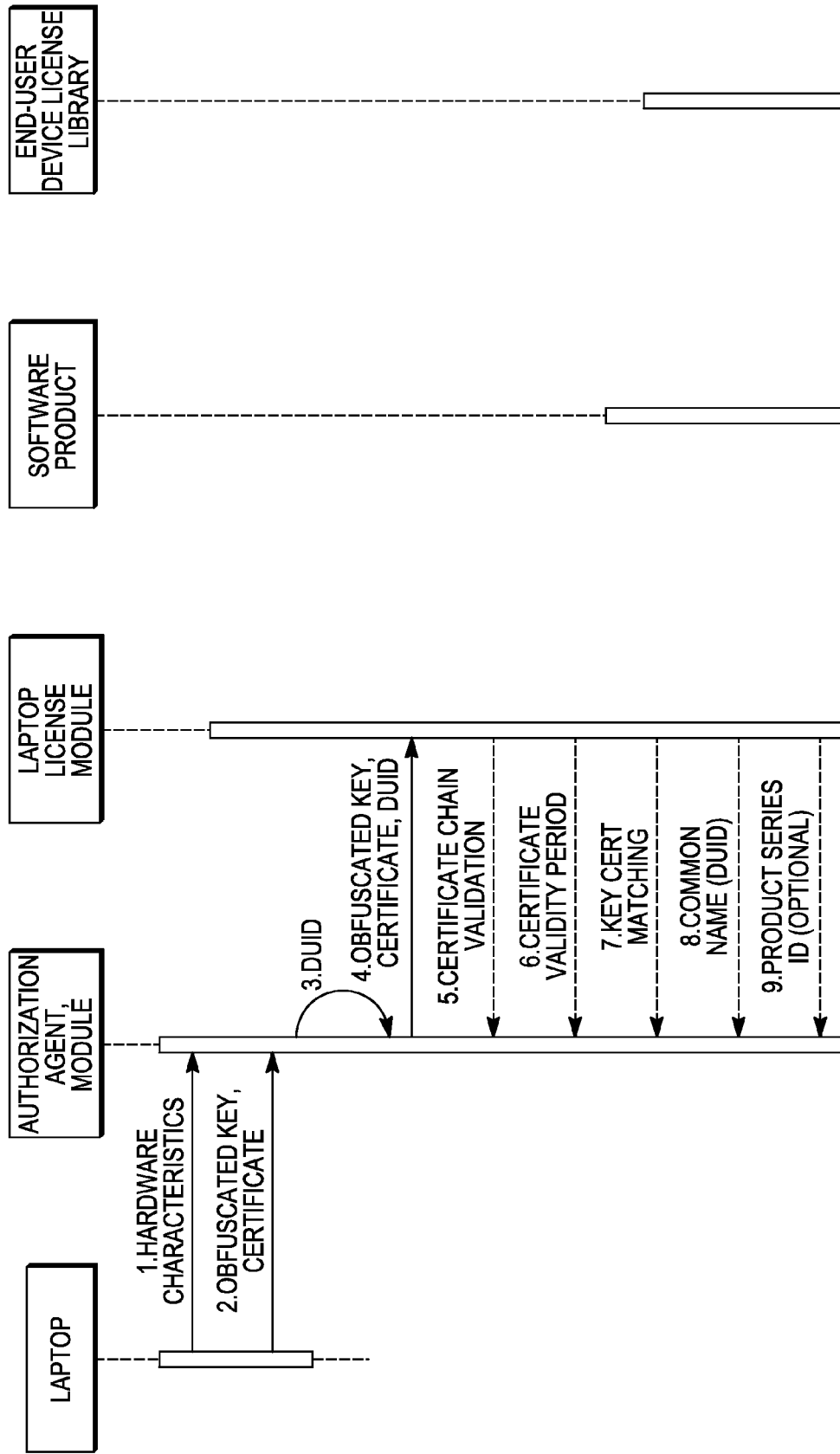
FIG. 9 is a message flow diagram showing an example of a process performed by a technician to install a license on an end user electronic device.
Figure 9B:
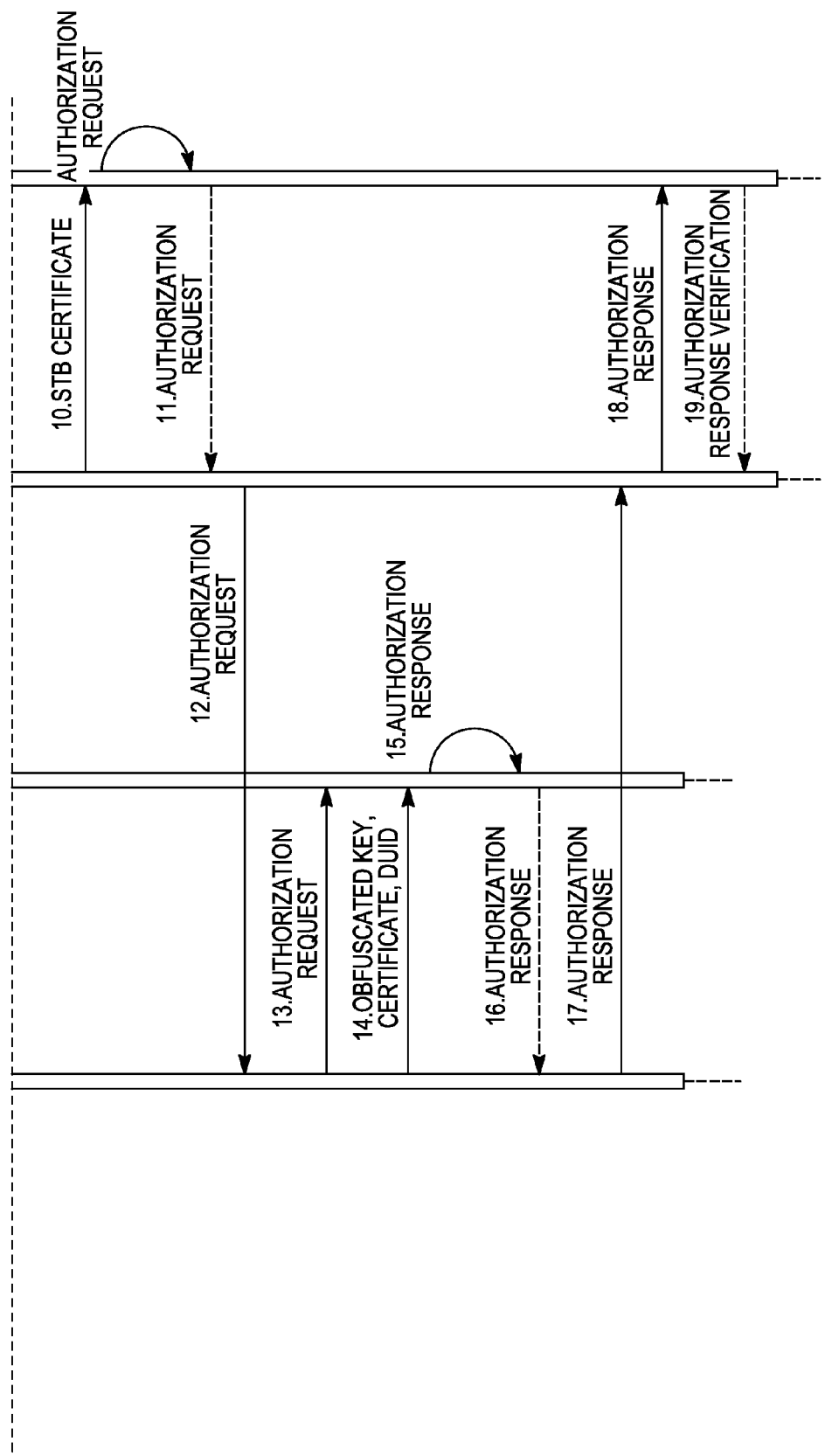

A more detailed example of the licensing process performed by the technician on the end user premises, which was discussed in connection with FIG. 4, is illustrated by the data flow diagram shown in FIG. 9. In this example, the software product is assumed to already be resident on the end user electronic device. In addition, a licensing library similar to the library located on the authorization agent device is resident on the end user electronic device. The process begins when the authentication agent (a laptop in this example) sends its hardware characteristics to the authentication agent module at 1. The authentication agent module also reads the obfuscated private key and the certificate from the authentication agent at 2 and recreates a DUID from the hardware characteristics at 3. At 4, the obfuscated private key, certificate and DUID are internally transferred by the authorization agent module to the licensing library in the authorization agent device. The licensing library then verifies for the authorization agent module that the authorization agent device has the authority to authorize the software product for use on the end user electronic device. In particular, the authorization agent module verifies that the certificate is in the trusted certificate chain (at 5), has a current validity period (at 6), matches the private key (at 7), is issued to the laptop (at 8) and has the correct product series ID (at 9). These validation steps may be performed in any order. If any of them fails, the certificate will not be used.

When the diagnostic or other software product residing on the end user authentication device is initialized, it reads the device ID from the authentication device's factory-provisioned certificate at 10 and sends it to the license library on the end user electronic device. The license library composes an authorization request in a predefined format at 11 and sends it to the software product at 12, which in turn sends it to the authorization agent module residing on the authorization agent device at 13. The module transfers the authorization request to the license library on the authorization agent device at 14, along with the obfuscated key, the certificate and the DUID at 15. Based on this information the license library on the authorization agent device develops an authorization response in a predefined format at 15 and sends it to the authorization agent device module at 16.

The module forwards the authorization response to the software product residing on the end user electronic device at 17 and the software module sends it to its local license library at 18. Finally, at 19, the license library verifies the authorization, which may include verification of such items as validating the certificate chain of the authorization agent's certificate with the root certificate being pre-provisioned in the end-user electronic device. Validation of the certificate chain may include validation of the signatures and issuer names. The authorization process may also include verification of the signature on the authorization response, verification that the DUID and product series ID in the authorization response match those in the request, and verification that the nonce in the authorization response matches the nonce value in the request generated by the device. If verified successfully, the license library notifies the software product, which is now ready to be used by the technician.

As used in this application, the terms "component," "module," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

The invention claimed is:

1. A method for enabling selected features of a software product residing on an end user electronic device with a license delivered from a licensing provider to a service provider of the end user electronic device, comprising:
   requesting at least one license to authorize the service provider to enable selected features of the software product residing on the end user electronic device;
   receiving an encrypted installation key that is unique to the service provider;
   receiving an authorization agent module for installation on one or more authorization agent devices associated with the service provider;
   installing the encrypted installation key and the authorization agent module on the one or more authorization agent devices, wherein the installing of the authorization agent module includes using the encrypted installation key as a product key to install the authorization agent module;
   generating a device-unique identifier (DUID) for each authorization agent device based on hardware characteristics of the respective authorization agent devices;
   sending the DUID and the encrypted installation key from at least one of the authorization agent devices to the licensing provider in order to obtain the requested license;
   receiving the requested license on said at least one of the authorization agent devices if the DUID and the encrypted installation key are validated by the licensing provider; and
   using the license on said at least one authorization agent device to authorize and enable the selected features of the software product on the end user electronic device.

2. The method of claim 1 wherein the license includes a digital certificate and a private key.

3. The method of claim 2 wherein an installer component is resident on said at least one of the authorization agent devices and wherein the digital certificate and private key are received by the installer component product and further comprising generating an obfuscated key from the private key received by the installer component product and storing the digital certificate and the obfuscated key on said at least one of the authorization agent devices.

4. The method of claim 1 wherein using the license to authorize and enable the selected features of the software product on the end user device further comprises:
   receiving from the end user electronic device a request to execute at least one of the selected features of the software product, said request including a digital signature generated by the end user electronic device, and a digital certificate of the end user electronic device; and
   verifying an identity of the end user electronic device by verifying the digital signature and the digital certificate.

5. The method of claim 4 wherein the request received from the end user electronic device includes a nonce value and further comprising transferring the nonce value back to the end user electronic device along with the license.

6. The method of claim 2 further comprising installing the requested license in the authorization agent device so that is accessible to the authorization agent module and validating the license by verifying the private key with the public key included in the digital certificate and verifying that the digital certificate is chained to an appropriate certification authority.

7. A method for delegating authorization of selected features of a software product residing on an end user electronic device from a licensing provider to a service provider of the end user electronic device, comprising:
   receiving a request from the service provider for authorization to use one or more authorization agent devices to enable the selected features of the software product residing on the end user electronic device;
   generating an installation key that is unique to the service provider;
   encrypting the installation key;
   sending an authorization agent module and the encrypted installation key for installation on one or more authorization agent devices associated with the service provider, wherein the installing of the authorization agent module includes using the encrypted installation key as a product key to install the authorization agent module;
   receiving a request for a license to enable the selected features of the software product, the request including the encrypted installation key and a device-unique identifier (DUID) from a first of the authorization agent devices, said DUID being based on hardware characteristics of the first authorization agent device;
   authenticating the first service provider by validating the encrypted installation key received from the first authorization agent device; and
   sending the requested license to the first authorization agent device if the encrypted installation key is validated by the licensing provider.

8. The method of claim 7 wherein receiving the request further comprises receiving a request for a plurality of licenses from the service provider for authorization to have a plurality of authorization agent devices associated therewith to enable the selected features of the software product.

9. The method of claim 7 wherein the encrypted installation key includes an identifier of the service provider, an identifier of the software product, and an expiration date of the requested license.

10. The method of claim 7 further comprising determining if the service provider has sufficient credit against which the requested license is to be charged and wherein sending the requested license to the first authorization agent device includes sending the requested license to the first authorization agent device if the encrypted installation key is validated by the licensing provider and if the service provider is determined to have sufficient credit.

11. The method of claim 7 wherein authenticating the first authentication device further includes comparing an IP address from which the request for the license was sent to a preapproved list of IP addresses provided by the service provider.

12. The method of claim 8 further comprising determining if the service provider has sufficient credit against which the plurality of requested licenses is to be charged prior to authorizing installation of the encrypted installation key on the plurality of authorization agent devices.

13. An authorization agent module, installed on an authorization agent device using a received encrypted version of an installation key as a product key, comprising instructions encoded on at least one non-transitory computer-readable medium associated with the authorization agent device, wherein the instructions, when executed by a processor, perform a method including:
   generating a device-unique identifier (DUID) for the authorization agent device based on hardware characteristics of the authorization agent device;
   causing the DUID and the encrypted version of the installation key associated with a service provider to be sent to a licensing provider in order to obtain a license to enable selected features of a software product residing on an end user electronic device;
   receiving the requested license if the encrypted installation key is validated by the licensing provider; and
   using the license to cause the end user electronic device to enable the selected features of the software product.

14. The authorization agent module of claim 13 wherein the instructions further include:
   receiving an authorization request from the end user electronic device;
   generating an authorization response if a digital signature over the authorization request and a certificate chain that includes a device certificate pre-provisioned on the end-user electronic device are validated; and
   sending the authorization response to the end user electronic device.

15. The authorization agent module of claim 13 wherein the instructions further include causing a request to extend a validity period of the license to be sent to the license provider and in response thereto receiving a new encrypted installation key to be used in subsequently license requests.

16. The authorization agent module of claim 13 wherein an installer component is resident on the authorization agent device and wherein a digital certificate and a private key are received by the installer component and wherein the instructions further include:
   generating an obfuscated key from the private key received by the installer component and
   storing the digital certificate and the obfuscated key on the authorization agent device.

17. The authorization agent module of claim 13 wherein using the license further comprises:
   receiving from the end user electronic device a request to execute at least one of the selected features of the software product, said request including a digital signature of the end user electronic device and a digital certificate of the end user electronic device; and
   verifying an identity of the end user electronic device by verifying the digital signature and the digital certificate against a list of trusted certificate authorities.

18. The authorization agent module of claim 17 wherein the request received from the end user electronic device includes a nonce value and further comprising transferring the nonce value back to the end user electronic device within an authorization response.

19. The authorization agent module of claim 13 wherein the instructions further include verifying an existing license on the authorization agent device in order to reuse the existing license when an updated version of an authorization agent module is installed on the authorization device.

20. The authorization agent module of claim 13 wherein the instructions further include:
   sending a message to the licensing provider notifying the service provider that the license has been uninstalled; and
   receiving a confirmation from the licensing provider, said confirmation including notification of any credit give back to the service provider as a result of the un-installation.

* * * * *